United States Patent [19]

Nutter

[11] Patent Number: 4,549,740
[45] Date of Patent: Oct. 29, 1985

[54] COUPLING GUARD SEAL ASSEMBLY

[75] Inventor: Norman E. Nutter, Lunenburg, Mass.

[73] Assignee: General Elecrtric Company, Lynn, Mass.

[21] Appl. No.: 685,641

[22] Filed: Dec. 24, 1984

[51] Int. Cl.[4] ............................................. F16J 15/16
[52] U.S. Cl. .................................. 277/189; 277/165; 277/166; 277/178
[58] Field of Search ........ 277/165, 166, 178, 181–186, 277/189, 216

[56] References Cited

U.S. PATENT DOCUMENTS

| | | | |
|---|---|---|---|
| 2,246,685 | 6/1941 | Johansen | 277/166 X |
| 2,661,967 | 12/1953 | Mitchell | 277/165 |
| 2,703,739 | 3/1955 | Koplin | 277/165 |
| 2,762,668 | 9/1956 | Meijer et al. | 277/165 X |
| 3,393,917 | 7/1968 | Kendall et al. | 277/165 X |

FOREIGN PATENT DOCUMENTS 1003674  3/1957  Fed. Rep. of Germany ...... 277/189

Primary Examiner—Robert S. Ward
Attorney, Agent, or Firm—James W. Mitchell

[57] ABSTRACT

A coupling between two shafts surrounded by a coupling guard seal assembly to prevent the leakage of fluid from out of the coupling. The coupling guard includes two coaxial closed overlapping surfaces otherwise described as inner and outer cylinders. The inner surface is formed with a groove which contains an annular gasket and notched ring. The outer surface includes circumferentially spaced apart slots which when aligned with the notches provide key ways for cam pins. When assembled the cam pins are each locked against the notched ring causing the "O" ring to elongate in the radial direction to provide an improved seal.

3 Claims, 5 Drawing Figures

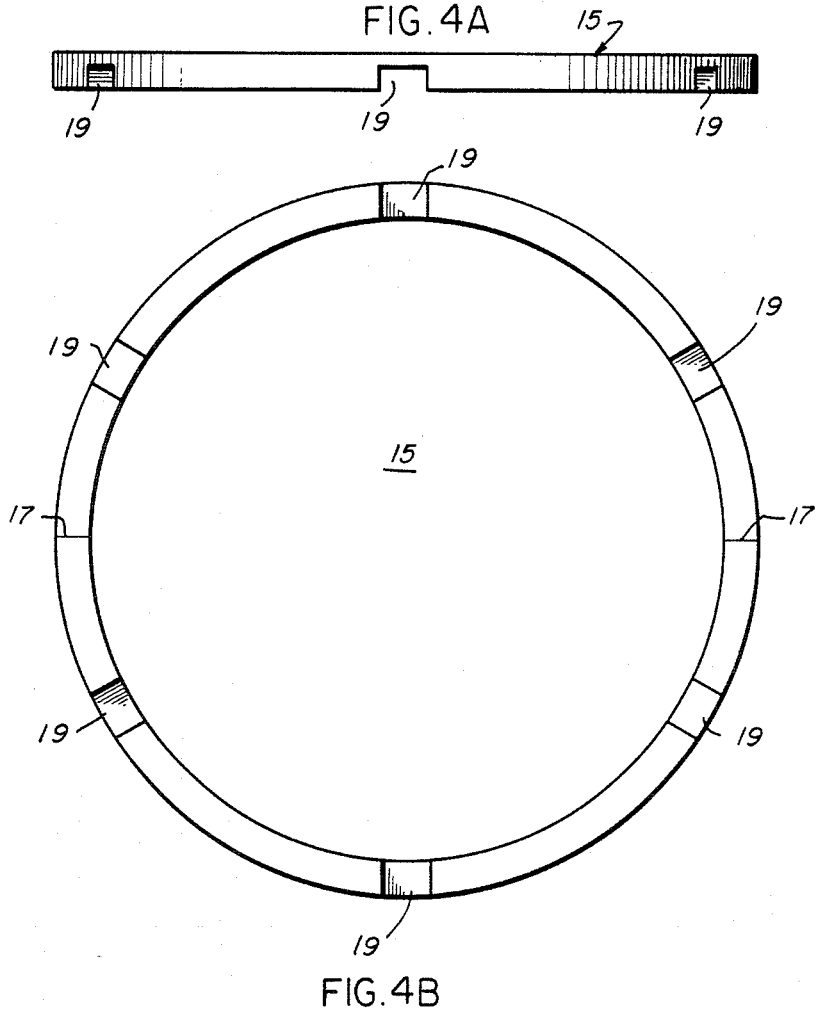

COUPLING GUARD SEAL ASSEMBLY

The present invention relates in general to improving a seal between overlapping cylinders and in particular to providing an improved performance coupling guard seal assembly.

BACKGROUND OF THE INVENTION

In the field of rotating machinery, and in particular propulsion equipment, it is a common occurrence to couple together two shafts which may have a common axis of rotation or which may even be perpendicular with respect to one another. The "coupling" often requires that a lubricant be introduced into the coupling area and that the coupling guard seal assembly be constructed so as to contain the lubricant without leakage. The coupling guard seal assembly may include two coaxial cylinders having their remote ends attached to separate machine casings and their proximate ends jointed to each other in overlapping relation. It is further common to provide an annular seal between the overlapping surfaces to prevent axial leakage of fluid out of the coupling guard seal assembly. The present invention addresses the seal between the overlapping cylinders.

A coupling guard seal assembly is carefully assembled with a seal interposed between overlapping surfaces. Misalignment of that seal during assembly or movement of the seal during subsequent use can only be corrected by total disassembly of the coupling guard seal assembly and subsequent reconstruction.

Also, in the assembly of a coupling guard, it is desirable for the overlapping ends of the cylinders to fit as tightly together as possible. The annular seal increases the requirement for annular radial clearance which is inconsistent with the aforesaid desirability of a tight almost interference fit between the cylinders.

OBJECTS OF THE INVENTION

It is a principle object of the present invention to provide a new and improved apparatus for providing a seal between the overlapping surfaces of joined cylinders which is not subject to the aforementioned problems and disadvantages.

A more specific object of the present invention is to provide an improved coupling guard seal assembly which will permit readjustment of the seal after the coupling guard seal assembly has been assembled.

Another object of the invention is to provide an improved coupling guard seal assembly wherein the annular radial dimension of the seal may be increased after the overlapping cylinders are joined.

SUMMARY OF THE INVENTION

The foregoing objects of the invention are achieved through the use of a new and improved seal assembly which provides a seal for lubricant, or the like, between overlapping surfaces of a pair of cylindrical members which comprise a coupling guard seal assembly. An annular groove is formed around the exterior circumference of an inner cylinder with an "O" ring gasket position therein. Further an annular compression ring is positioned in the annular groove next to the "O" ring, the annular compression ring including a plurality of circumferentially spaced apart notches formed in the compression ring side spaced away from the "O" ring gasket. A plurality of slots are formed through the outer cylinder wall and aligned with the notches being formed in the annular compression ring. A plurality of cam pins are each inserted into a respective slot and notch whereby in a lock position the cam pin forces the compression ring against the "O" ring gasket causing the "O" ring gasket to elongate in the radial direction.

DETAILED DESCRIPTION OF THE INVENTION

Figure 1:
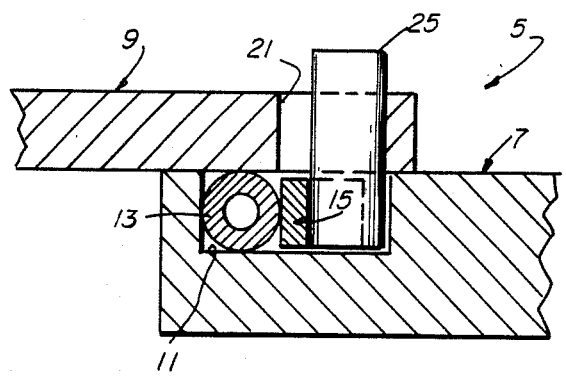
FIG. 1 is an elevation cross section of the overlapping sections of a pair of cylindrical members showing the improved coupling guard seal assembly according to the present invention.

FIG. 1 shows the overlapping portion of a coupling guard seal assembly 5 which includes inner cylinder or cylindrical portion 7 and outer cylinder or cylindrical portion 9. Usually the cylinders are axially aligned or coaxial and extend in opposite directions from their mating surfaces to have their remote ends affixed to respective machine casings (not shown). In the description of the invention, the term cylinder is used to describe the overlapping parts of the coupling guard seal assembly and is not meant to limit the invention to coaxial cylinders since the invention is equally applicable to cylinders which are generally perpendicular as in an elbow joint but where the overlapping mating surfaces are coaxial cylinders.

The inner cylinder is formed with an annular groove 11 which extends axially along a substantial portion of the overlapping cylinders. An "O" ring gasket 13 is disposed in the annular groove and is followed by a notched compression ring 15. Notched ring 15 is described with reference to FIG. 4 where 4A is a plan view and 4B is an elevation view. The notched ring 15 is an annulus with a pair of opposite cuts 17 made approximately 180° apart to facilitate assembly to the inner cylinder. The ring is also formed with a plurality of circumferentially spaced apart notches 19 which when assembled into the annular groove 11 are disposed away from the "O" ring gasket; that is, on the notched ring side noncontiguous with the "O" ring gasket. The "O" ring is, of course, made from a deformable material whereas the notched ring is made from a noncompressible material.

Figure 2:
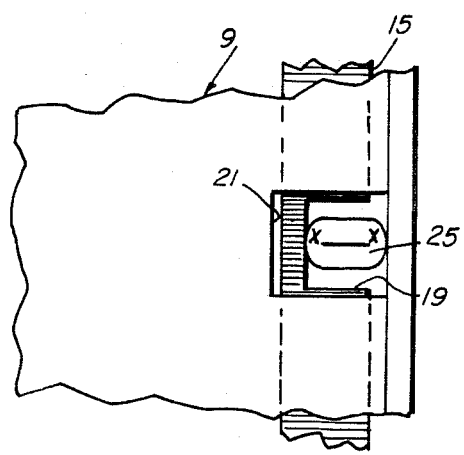
FIG. 2 is a plan view taken from FIG. 1.

Referring back to FIGS. 1 and 2, the outer cylinder 9 is formed with a plurality of slots 21 which are spaced apart from one another around the circumference of the outer cylinder. As can be seen especially with reference to FIG. 2, each slot is aligned with a corresponding notch in the notched ring 15. A cam pin 25 is inserted into the aligned slot and notch and may assume two positions; i.e., locked or unlocked. As viewed in FIG. 2, the cam pin is turned so that its major axis X—X lies parallel to the axial centerline of the cylinders and it is in the locked position. If the major axis X—X is perpendicular to the cylinder axis, the cam pin is unlocked. In the locked position, the cam pin bears against the notch in the notched ring causing the "O" ring gasket adjacent the notched ring to be depressed and therefore elongated (not shown) in the radial direction. Actually, the elongation may be otherwise manifested in a tighter seal between the inside surface of cylinder 9 and the axial extending surface of the groove 11. In this way, an improved seal is formed between the two cylinders.

Figure 3:
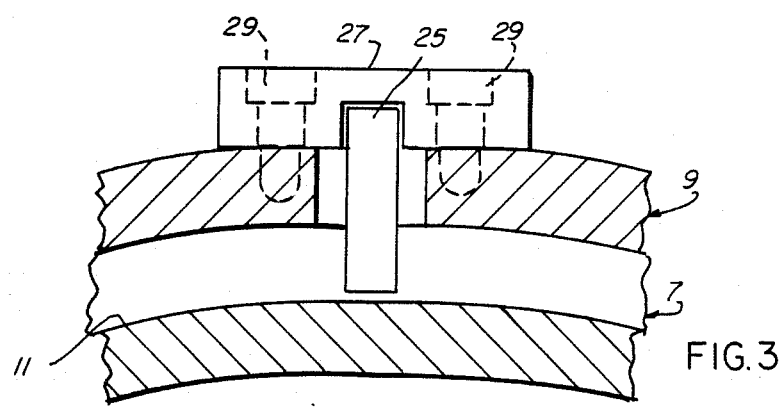
FIG. 3 is a simplied end view of the two overlapping cylindrical members with the cam pin and cap installed; and, FIG. 4 including 4A and 4B are respectively plan and elevation views of the annular compression ring.

Referring to FIG. 3, cap 27 is shown as being assembled over the cam pin 25 whereas the cap 27 is then fixed to the outer cylinder by means of screws or bolts 29. This prevents the cam pin from inadvertently rotating or becoming otherwise displaced. Alternatively, the cap and cam pin could be integrally formed so that the cap itself could be useful in turning the cam pin.

In summary, the coupling guard seal assembly is assembled in the following manner. An "O" ring gasket 13 and notched ring 15 are assembled into an annular groove 11 formed in the outer surface of the inner cylinder 7. The outer cylinder 9 is then overlapped onto the inner cylinder so that the slots 21 are aligned with notches 19. A cam pin is inserted into the assembly through slots 21 into notch 19 whereupon the cam pin is turned and staked by cap 27. The cam pin bears against the notched ring which in turn bears against the "O" ring gasket to elongate the "O" ring gasket in the radial direction.

According to the objects of the invention, the "O" ring gasket may be selectively adjusted while in place with the coupling guard assembly in tact. Clearance requirements between the inner and outer cylinder are minimized because the "O" ring gasket does not become radially elongated until both the inner and outer cylinders are in place and assembled.

It will be obvious to those skilled in the art that while a preferred embodiment of the invention has been described and illustrated herein, the invention is not so limited. For example, while the preferred embodiment has been described in terms of mating cylinders, the cylinders might otherwise be configured to be elliptical or rectangular with rounded corners. Cylindrical shall be taken to mean a bounded area which has an axial dimension. "O" ring seal means any deformable gasket.

It will be understood that numerous modifications, changes, variations, substitutions and equivalents will occur to those skilled in the art, all of which fall within the spirit and scope contemplated by the present invention. Accordingly, it is intended that the invention herein be limited only by the scope of the appended claims.

What is claimed is:

1. A seal assembly comprising:
    an inner surface and an outer surface in part concentrically positioned with respect to one another, the outer surface partially overlapping the inner surface to form an overlapping joint;
    a groove formed on the exterior of the inner surface;
    a gasket positioned in the groove;
    a notched ring positioned in the groove adjacent the gasket including a plurality of notches formed on the ring side further away from the gasket;
    a plurality of slots formed through the outer surface and aligned with the notches formed in the ring; and,
    a plurality of cam pins each inserted through a slot and into a notch whereby in a locked position the cam pin forces the notched ring against the gasket causing the gasket to elongate in the radial direction against the two surfaces.

2. A coupling guard seal assembly comprising:
    an inner cylinder and an outer cylinder, in part, concentrically positioned with respect to one another, the outer cylinder partially overlapping the inner cylinder to form an overlapping joint;
    an annular groove formed around the exterior circumference of the inner cylinder;
    an annular gasket positioned in the annular groove;
    a notched ring positioned in the groove next to the annular gasket, the ring including a plurality of circumferentially spaced apart notches, the notches being formed in the ring side spaced away from the gasket;
    a plurality of slots formed through the outer cylinder and aligned with notches formed in the notched ring; and,
    a plurality of cam pins each inserted through a slot and into a notch whereby in a locked position the cam pin forces the notched ring against the gasket causing the gasket to elongate in the radial direction against the inner and outer cylinders.

3. The coupling guard seal assembly recited in claim 2 further comprising:
    a cap positioned over each cam pin extending out of a slot in the outer cylinder; and,
    at least one fastener extending through each cap into the outer cylinder to prevent rotation of the cam pin.

* * * * *